Patented Jan. 16, 1940

2,187,366

UNITED STATES PATENT OFFICE 2,187,366

MANUFACTURE OF VANILLIN

Leo Schulz, Miltitz, near Leipzig, Germany, assignor to Schimmel & Co. A. G., Miltitz, near Leipzig, Germany, a corporation of Germany No Drawing. Application December 15, 1937, Serial No. 179,886. In Germany February 3, 1937

11 Claims. (Cl. 260—600)

This invention relates to manufacture of vanillin; and it comprises a process of manufacturing vanillin from lignin-containing substances, such as sulfite waste liquor, for example, wherein such a substance is heated, in an aqueous liquor containing an alkali and an aromatic nitro compound, to temperatures producing the oxidation of the lignin to vanillin, and the resulting vanillin is recovered from the reaction products; all as more fully hereinafter set forth and as claimed.

Various methods have been suggested in the art for converting lignin into vanillin. Most of these methods have been developed in the laboratory as the result of scientific investigations. That these methods would not be economically feasible is indicated by the low yields obtained, which amount to only about 2 to 3 per cent, based on the lignin substance in the starting material, that is, about 1 to 2 per cent of the sulfite waste liquor solids. It has also been proposed to convert lignin into vanillin by the use of various oxidizing agents but the yields of vanillin actually recovered from the reaction products have been small in all reported cases.

I have found that lignin-containing substances, such as sulfite waste liquor, can be readily converted into vanillin with a yield averaging from about 8 to 10 per cent by weight, calculated on the weight of the sulfite liquor solids. In this method the lignin-containing substances are digested at elevated temperatures in an alkaline aqueous liquor containing an aromatic nitro compound such as nitrobenzene. The latter apparently acts as an oxidizing agent since azobenzene can be recovered from the reaction products. After this digestion, which is advantageously conducted under superatmospheric pressures, the liquor is acidified and the crude vanillin can be extracted from the reaction products with a solvent, such as benzene or ethylene chloride. The vanillin can be separated from this extract by distilling off the benzene, then distilling and crystallizing the vanillin.

In those prior art processes, in which an alkaline pressure-cooking has been employed, it has been found that, upon acidification of the reaction liquor, there occurs a substantial precipitation of lignin substance which must be removed from the liquor. In the present process no similar precipitation occurs. In fact, the reaction liquor obtained in my process appears to be substantially free from lignin. Upon acidification of this liquor a small amount of resin separates, otherwise no precipitation occurs.

Aromatic nitro compounds of the benzene series can be employed in my process. The more useful compounds can be represented by the general formula $NO_2$—R—X wherein R represents an aromatic residue of the benzene series which may be further substituted, and X represents hydrogen or a water solubilizing group, such as —COOH, —ONa, —$SO_3H$, etc. Other substituent groups which may be present in the molecule are alkyl, nitro, halogen, alkoxy, additional water solubilizing groups and other non-reactive groups. Specific compounds found useful include nitrobenzene, the dinitrobenzenes, the nitrobenzoates, the nitrobenzene sulfonic acids, the nitronaphthols, sodium nitro-phenate, etc. The nitro group in these compounds appears to be the active part of the molecule since the structure of the rest of the molecule has been found to be of but little importance so long as this is non-reactive in the process. It can be said that all aromatic nitro compounds of the benzene series, in which the nitro group is the group most reactive with lignin under the conditions of the reaction, are suitable for use in my process. These compounds are advantageously added to the reaction mix in proportions somewhat in excess of those theoretically required to convert the lignin present into vanillin.

The temperatures used in my process may be varied rather widely. If a nitro compound is used, which is soluble in water or in alkaline solution, such as an alkali metal nitrobenzoate, for example, lower temperatures can be employed, since the oxidation reaction takes place at lower temperatures. The correct temperature to be employed with a given nitro compound can be readily determined by a series of tests made at different temperatures. It is, of course, advantageous to employ as low temperatures as possible. With nitrobenzene, for example, I have found that satisfactory yields are obtained over a temperature range of from about 175° to 225° C. Temperatures above the boiling points of the reaction mixtures, are usually required for best results and, when these temperatures are employed, it is necessary to conduct the reaction in closed vessels at superatmospheric autogenous pressures. Broadly speaking it is only necessary, in conducting my process, to mix a lignin-containing substance with water, with a caustic alkali and with an aromatic nitro compound, and to heat this mixture to temperatures capable of causing the nitro compound to react with the lignin, oxidizing the latter to form vanillin.

All lignin-containing materials are useful in my process, this term even including wood flour, for example, but it is advantageous to employ materials which are relatively free from extraneous substances such as cellulose. For this reason I prefer to employ waste sulfite liquor or lignin preparations obtained from such liquor. Several processes have been described in the art for the recovery of lignin from waste sulfite liquor, for example the processes of the U. S. Patents Nos. 1,856,558 and Re. 18,268. All preparations of this nature, which are rich in lignin, are useful as raw materials in my process.

The following specific examples illustrate two different processes which may be employed, in accordance with the present invention, for the recovery of vanillin from lignin-containing substances, these examples representing practical operations which are commercially feasible.

Example 1

A mixture was made containing 1.7 kilograms of waste sulfite liquor solids, 10 kilograms of water, 2 kilograms of nitrobenzene and 2 kilograms of caustic soda. This mixture was digested in a closed vessel at a temperature of about 200° C. for 1 hour. The reaction liquor from this process was then acidified, the vanillin was extracted with benzene, the benzene was distilled from the extract to recover a crude vanillin and the latter was purified by distillation and finally by crystallization. A total of 135 grams of pure vanillin was recovered, this representing about 8 per cent of the dry sulfite solids. In the distillation of the crude vanillin a distillation residue of about 22 grams was obtained. And 1200 grams of azobenzene were recovered, this representing about 80 per cent of that calculated from theory.

Example 2

A mixture was made containing 1.7 kilograms of waste sulfite liquor solids, 4 kilograms of nitrobenzene, 4 kilograms of caustic potash and 12 kilograms of water. This mixture was digested at a temperature of about 200° C. for 1 hour. And, after proceeding further as described in Example 1, a total of 168 grams of purified vanillin was recovered.

One advantage of my invention is that it is possible to ferment the waste sulfite liquor, by known methods, with the production of alcohol, prior to the digestion step and without any reduction in the yield of vanillin obtained in the latter step. The inclusion of a fermentation step prior to the digestion step of my process therefore forms a highly advantageous embodiment of the present invention.

While I have disclosed what I consider to be the best embodiments of my invention, it is obvious that many modifications can be made in the specific procedures which have been described without departing from the purview of the present invention. For example, it is possible to employ any of the alkaline metal caustic alkalis in the digestion liquor of my invention in order to impart the necessary strong, caustic reaction. It is also possible to employ alkaline reacting salts for this purpose. Various organic solvents can be employed in order to extract the vanillin from the reaction products. And it is possible to vary rather widely the proportions of the nitro compound, caustic alkali and water, as well as the temperatures and pressures employed, in my process. When different lignin-containing substances are employed, it is possible to vary these conditions in such fashion as to obtain maximum yields of vanillin, the tests required to determine these conditions being within the skill of the art. Other modifications which fall within the scope of the following claims will be immediately evident to those skilled in this art.

What I claim is:

1. In the recovery of vanillin from lignin-containing substances, the process which comprises mixing such a substance with water, with caustic alkali and with an aromatic nitro compound of the benzene series in which the nitro group is the group most reactive with lignin under the conditions of the reaction, heating this mixture to temperatures sufficiently high to cause the nitro compound to oxidize the lignin to vanillin, and recovering the vanillin from the reaction products.

2. In the process of converting lignin into vanillin, the step which comprises digesting a mixture of a lignin-containing substance, with a nitro compound of the benezene series in which the nitro group is the group most reactive with lignin under the conditions of the reaction, in an aqueous solution of a caustic alkali at elevated temperatures sufficient to produce oxidation of the lignin to vanillin.

3. The process of claim 2 wherein the nitro compound is water soluble and contains at least one sulfonic acid group.

4. The process of claim 2 wherein the nitro compound is water soluble and contains at least one carboxylic acid group.

5. The process of claim 2 wherein the nitro compound is one which can be represented by the general formula $NO_2-R-X$, wherein R represents an aromatic residue of the benzene series which may be further substituted with alkyl, nitro, halogen, alkoxy, water solubilizing groups and other non-reactive groups, and X represents hydrogen or a water solubilizing group.

6. The process of claim 2 wherein the nitro compound is one represented by the general formula $NO_2-R-X$, wherein R represents an aromatic residue of the benzene series and X represents $-COOH$, $-ONa$ or $-SO_3H$.

7. The process of claim 2 wherein the lignin-containing substance is selected from a group consisting of sulfite waste liquor, sulfite waste liquor solids, lignin preparations recovered from waste sulfite liquor, and fermented waste sulfite liquor.

8. In the process of converting lignin into vanillin, the step which comprises submitting to a pressure cooking a mixture of a lignin-containing substance with a nitro compound of the benzene series in which the nitro group is the group most reactive with lignin under the conditions of the reaction, and with an aqueous solution having a strongly caustic reaction, said pressure-cooking being conducted at temperatures above the boiling point of the reaction mixture.

9. The process of claim 8 wherein the nitro compound is nitrobenzene and in which temperatures ranging from about 175° to 225° C. are employed.

10. The process which comprises fermenting waste sulfite liquor to obtain alcohol, removing the alcohol, adding a caustic alkali and an aromatic nitro compound of the benzene series in which the nitro group is the group most reactive with the lignin of the sulfite liquor under the conditions of the reaction, subjecting the resulting mixture to a pressure-cooking at temperatures sufficiently high to cause the oxidation of the lignin to vanillin, and recovering the vanillin from the reaction products.

11. The process which comprises mixing waste sulfite liquor solids with an aqueous liquor containing a caustic alkali and with nitrobenzene, subjecting this mixture to a pressure-cooking for about one hour at temperatures of between 175° to 225° C. and recovering vanillin from the reaction products.

LEO SCHULZ.